(12) United States Patent
Masuda (10) Patent No.: US 9,065,082 B2
(45) Date of Patent: Jun. 23, 2015

(54) ELECTRIC STORAGE DEVICE

(71) Applicant: GS Yuasa International Ltd., Kyoto-shi (JP)

(72) Inventor: Hideki Masuda, Kyoto (JP)

(73) Assignee: GS YUASA INTERNATIONAL LTD., Kyoto-Shi, Kyoto (JP)

( * ) Notice: Subject to any disclaimer, the term of this patent is extended or adjusted under 35 U.S.C. 154(b) by 29 days.

(21) Appl. No.: 13/796,072

(22) Filed: Mar. 12, 2013

(65) Prior Publication Data

US 2013/0236770 A1    Sep. 12, 2013

(30) Foreign Application Priority Data

Mar. 12, 2012 (JP) ................................ 2012-054781
Jan. 16, 2013 (JP) ................................ 2013-005611
Mar. 11, 2013 (JP) ................................ 2013-047592

(51) Int. Cl.
| | |
|---|---|
| *H01M 2/02* | (2006.01) |
| *H01G 9/08* | (2006.01) |
| *H01M 2/04* | (2006.01) |
| *H01M 10/613* | (2014.01) |
| *H01M 10/647* | (2014.01) |
| *H01M 10/6554* | (2014.01) |

(52) U.S. Cl.
CPC .............. *H01M 2/0207* (2013.01); *H01G 9/08* (2013.01); *H01M 2/0217* (2013.01); *H01M 2/0473* (2013.01); *H01M 10/5004* (2013.01); *H01M 10/5032* (2013.01); *H01M 10/5053* (2013.01)

(58) Field of Classification Search
CPC .. Y02E 60/12; H01M 2/0207; H01M 2/0275; H01M 2/0404; H01M 2/0217; H01M 2/04; H01M 2/18; H01M 10/0585
USPC .................................................. 429/162, 163
See application file for complete search history.

(56) References Cited

U.S. PATENT DOCUMENTS

| | | | |
|---|---|---|---|
| 6,898,066 B1 | 5/2005 | Lin | |
| 2006/0141354 A1 | 6/2006 | Kwon | |
| 2008/0292913 A1* | 11/2008 | Hong et al. ....................... | 429/7 |
| 2011/0123854 A1 | 5/2011 | Kim | |
| 2013/0004824 A1* | 1/2013 | Naganawa et al. ........... | 429/130 |
| 2013/0260219 A1* | 10/2013 | Kim et al. ..................... | 429/163 |

FOREIGN PATENT DOCUMENTS

| | | |
|---|---|---|
| EP | 2 290 732 A1 | 3/2011 |
| JP | 2000-107831 A | 4/2000 |
| JP | 2002-117814 A | 4/2002 |
| JP | 2006-338992 A | 12/2006 |

OTHER PUBLICATIONS

European Search Report dated Jun. 24, 2013.

* cited by examiner

*Primary Examiner* — Cynthia H Kelly
*Assistant Examiner* — Monique Wills
(74) *Attorney, Agent, or Firm* — McGinn IP Law Group, PLLC (57) ABSTRACT

An electric storage device includes an electrode assembly and an outer case. The electrode assembly has at least one convex portion. The outer case accommodates the electrode assembly and has an inner wall with a recess in portion thereof opposite the at least one convex portion of the electrode assembly.

19 Claims, 10 Drawing Sheets

ELECTRIC STORAGE DEVICE

CROSS REFERENCE TO RELATED APPLICATION

This application claims priority from Japanese Patent Applications No. 2012-54781 filed on Mar. 12, 2012, No. 2013-005611 filed on Jan. 16, 2013, and No. 2013-47592 filed on Mar. 11, 2013.

FIELD

The present invention relates to an outer case structure of an electric storage device.

BACKGROUND

Conventionally, batteries including secondary batteries are used. A battery is configured such that an electrode assembly is accommodated in an outer case, which is made of metal such as aluminum (see JP-A-2002-117814, for example). In the battery, the electrode assembly expands due to heat generated during charging and discharging or due to environmental temperature variations. In order to prevent abnormal discharge or abnormal heat generation due to the interference between the outer case and the expanded electrode assembly from occurring, a clearance is provided between the outer case and the electrode assembly.

In recent years, in the field of electric storage devices including batteries, there is a demand for accommodating electrode assemblies as many as possible in a certain inner volume of the outer case and for reducing the volume of each electrode assembly while maintaining the power generating capacity in order to reduce the size of the electric storage device. To meet such a demand, a clearance between the electrode assembly and the outer case is designed to be narrowed to the requisite minimum that allows the electrode assembly to be brought into contact with the outer case when the electrode assembly expands. The demand of reducing the electric storage device still has not been met and further reduction in size of the electric storage device is required.

SUMMARY

An electric storage device includes an electrode assembly and an outer case. The electrode assembly has at least one convex portion. The outer case accommodates the electrode assembly and has an inner wall with a recess in a portion thereof opposite the at least one convex portion of the electrode assembly.

DESCRIPTION OF EMBODIMENTS

An objective of the present invention is to provide a technology for reducing a size of an electric storage device.

An electric storage device includes an electrode assembly and an outer case. The electrode assembly has at least one convex portion. The outer case accommodates the electrode assembly and has an inner wall with a recess in a portion thereof opposite the at least one convex portion of the electrode assembly.

A larger clearance can be provided around the portion in which the recess is formed in comparison to a portion in which the recess is not formed. Therefore, even when the portion of the outer case in which the recess is formed is arranged closer to the electrode assembly than the portion thereof in which the recess is not formed, a predetermined clearance can be provided. According to the electric storage device, the recess is formed in the inner wall of the outer case. Therefore, the portion of the outer case in which the recess is formed can be arranged closer to the convex portion of the electrode assembly in comparison to a configuration in which the recess is not formed and thus a size of the electric storage device can be reduced. Furthermore, because the recess is formed in the inner wall of the outer case, the distance between the convex portion of the electrode assembly and the outside of the electric storage device can be reduced and the surface area of the inner wall facing the electrode assembly can be increased. With this configuration, efficiency in cooling of the electric storage device can be improved.

The portion including the recess may be a portion of the inner wall adjacent to the convex portion of the electrode assembly. According to the electric storage device, the electrode assembly including the convex portion can be reliably positioned close to the outer case having the recess. Therefore, the size of the electric storage device can be reduced.

The recess may have a shape corresponding to a shape of the convex portion of the electrode assembly. According to the electric storage device, the electrode assembly including the convex portion can be reliably positioned close to the outer case having the recess. Therefore, the size of the electric storage device can be reduced.

The electrode assembly may have a flattened roll-like shape with a cross section having a first dimension smaller than a second dimension. The first dimension measures in a first direction. The second dimension measures in a second direction that is perpendicular to the first direction. The inner wall including the recess is opposite the electrode assembly in the second direction. According to the electric storage device, the electrode assembly can be arranged close to the outer case in the second direction. Therefore, the size of the electric storage device can be reduced.

The recess may be provided only in the inner wall opposite the electrode assembly in the second direction. According to the electric storage device, because the recess is not formed in an inner wall of the outer case opposite the electrode assembly in the first direction, the inner wall is flat. If the inner wall is flat, in comparison to the configuration in which the recess is formed in the inner wall, a positive electrode and a negative electrode of the electrode assembly are less likely to separate from each other in the first direction when the electrode assembly expands. With this configuration, an increase in internal resistance of the electrode assembly due to the separation between the positive electrode and the negative electrode can be suppressed. Therefore, stable power output characteristics of the electrode assembly can be ensured.

An end of the electrode assembly in the second direction and the recess may have arc-like shapes in a cross section perpendicular to an axial direction of the electrode assembly with centers of curvatures thereof being at a same point in the first direction and a curvature radius of the recess being equal to or larger than that of the end of the electrode assembly. According to the electric storage device, the electrode assembly can be arranged close to the outer case at the center of the recess at which the depth is the largest. Therefore, the size of the electric storage device can be reduced. By setting the curvature radius of the recess equal to that of the end of the electrode assembly, the end of the electrode assembly is in contact with the inner wall of the recess for the entire surface thereof when the electrode assembly expands. Therefore, the efficiency in cooling of the electrode assembly when the electrode assembly expands can be improved.

The electrode assembly may be accommodated in the outer case with an axial direction thereof aligned with a horizontal direction and the second direction aligned with a vertical direction. The recess is formed in an inner wall of at least one of a top and a bottom of the outer case. According to the electric storage device, the electrode assembly can be arranged close to the top or the bottom of the outer case. Therefore, the size of the electric storage device can be reduced.

The portion of the outer case in which the recess is formed may be thinner than a peripheral portion thereof. According to the electric storage device, with the portion of the outer case in which the recess is formed and reduced in thickness, the efficiency in cooling of the electrode assembly can be improved.

The outer case may have an outer wall with a protrusion in a portion corresponding to the recess. According to the electric storage device, because the protrusion is formed on the outer wall of the outer case, the surface area of the outer wall can be increased. Therefore, the efficiency in cooling of the electrode assembly can be improved.

The outer case may have a protrusion on the inner wall around a portion of the inner wall in which the recess is formed. According to the electric storage device, because the protrusion is formed on the inner wall of the outer case, the surface area of the inner wall can be increased. Therefore, the efficiency in cooling of the electrode assembly can be improved.

According to the present invention, an electric storage device can be formed in a reduced size.

First Embodiment

A first embodiment will be described with reference to FIGS. 1 to 3.

1. Configuration of Cell

Figure 1:
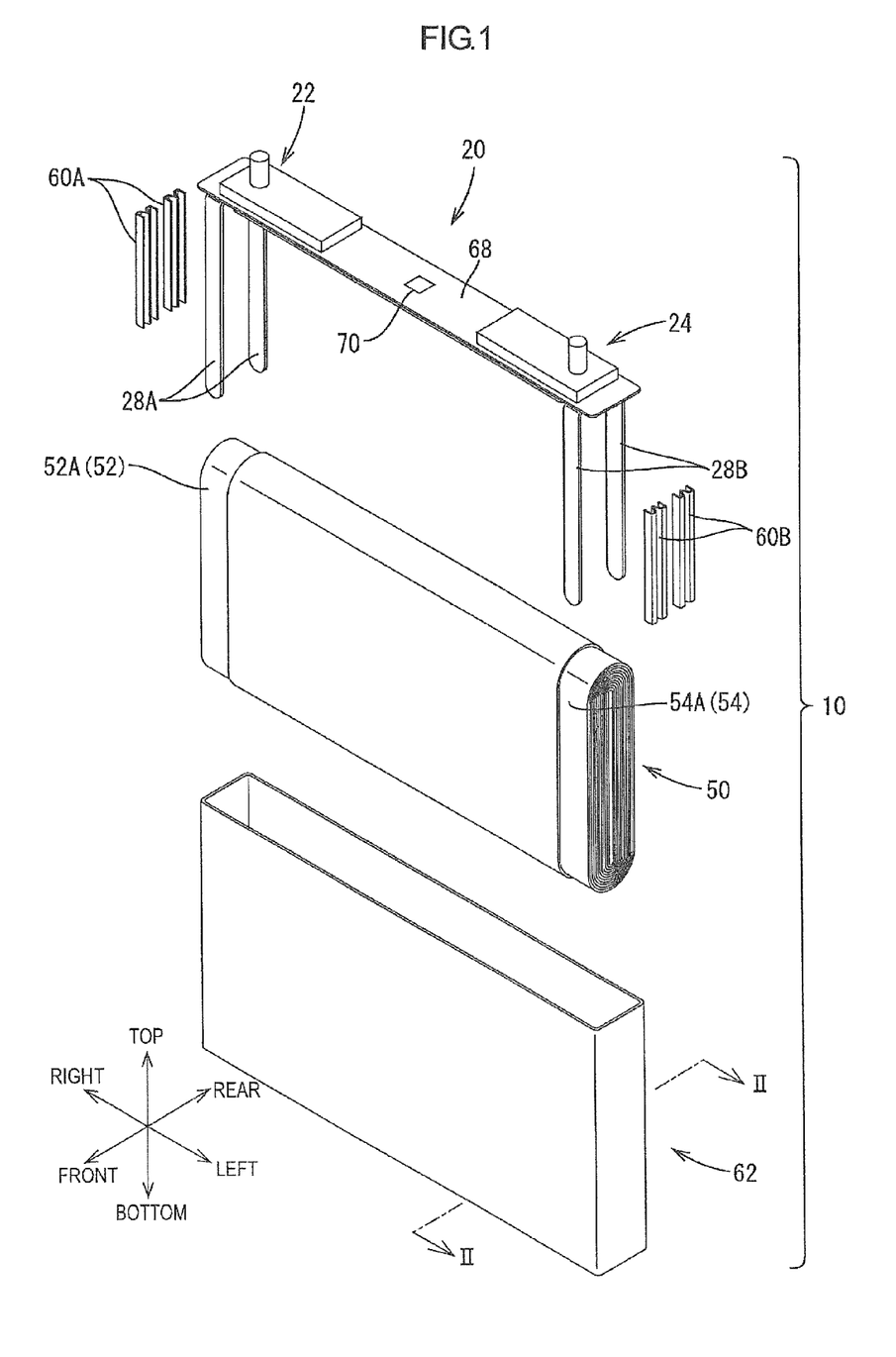
FIG. 1 is an exploded perspective view of a cell.

FIG. 1 is a perspective view of a cell 10 in this embodiment. The cell 10 illustrated in FIG. 1 is a secondary battery that can be repeatedly charged and discharged, more specifically, a lithium-ion battery. A plurality of cells 10 may be connected by a bus bar, which is a plate-shaped member having conductivity, and installed in an electric vehicle or a hybrid vehicle for supplying power to electric devices, for example. The cell 10 may be an example of an electric storage device.

As illustrated in FIG. 1, the cell 10 includes a terminal unit 20, an electrode assembly 50, a clip set 60, and a case 62. The case 62 is formed in a thin landscape rectangular box-like shape. The electrode assembly 50 has a flattened roll-like shape. Hereinafter, the cell 10 is described with the vertical direction in FIG. 1 as a vertical direction of the cell 10, a direction perpendicular to a side surface having a larger area among side surfaces of the case 62 as a front-rear direction of the cell 10, and a direction perpendicular to a side surface having a smaller area among the side surfaces of the case 62 as a horizontal direction of the cell 10. The vertical direction may be an example of a second direction. The front-rear direction may be an example of a first direction. The horizontal direction may be an example of an axial direction of the electrode assembly 50.

The case 62 is made of metal such as aluminum and formed by pressing (e.g., deep drawing). The case 62 is formed in an open-top shape with a top end thereof open. The case 62 accommodates the flat-shaped electrode assembly 50 therein and is filled with electrolyte. A top end opening of the case 62 is closed with a lid 68 that is a rectangular plate included in the terminal unit 20. The case 62 with the lid 68 may be an example of an outer case.

The terminal unit 20 includes the lid 68, a positive terminal 22, a negative terminal 24, positive current collectors 28A, negative current collectors 28B, and a safety valve 70. The positive terminal 22 and the negative terminal 24 are arranged away from each other in the horizontal direction on the upper surface of the lid 68. Pairs of current collectors 28A and 28B are arranged so as to extend downward from the lower surface of the lid 68. Each current collector 28A or 28B is a metal plate having a sufficient thickness for passing a large current. The current positive collectors 28A and the negative current collectors 28B are connected to the positive terminal 22 and the negative terminal 24, respectively. The positive current collectors 28A are aluminum alloy plates, for example. The negative current collectors 28B are copper alloy plates, for example. The safety valve 70 is arranged in the middle of the lid 68. The safety valve 70 is a non-restorable type safety valve for releasing internal gas inside the case 62 if an internal pressure of the case 62 becomes equal to or higher than a predetermined level.

The electrode assembly 50 includes a positive electrode 52, a negative electrode 54, and a separator (not illustrated). The electrode assembly 50 is configured such that the positive electrode 52 and the negative electrode 54 are wound in a flattened shape together with the separator arranged therebetween. In unwound states, the positive electrode 52 and the negative electrode 54 have a tape-like shape with the longitudinal direction thereof being a direction in which they are wound. The positive electrode 52 includes a tape-like shaped aluminum foil and a positive active material layer formed on a surface of the aluminum foil. A portion of the positive electrode 52 at one edge that extends in the longitudinal direction thereof is a positive current collector foil potion 52A in which the positive active material layer is not formed on the surface of the aluminum foil, that is, a bare aluminum foil is provided. The negative electrode 54 includes a tape-like shaped copper foil and a negative active material layer formed on a surface of the copper foil. A portion of the negative electrode 54 at one edge that extends in the longitudinal direction thereof is a negative current collector foil portion 54A in which the negative active material layer is not formed, that is, a bare copper foil is provided.

The positive electrode 52 and the negative electrode 54 are layered and wound such that the positive current collector foil portion 52A is located closer to an end than the separator and the negative electrode 54 and such that the negative current collector foil portion 54A is located closer to the opposite end than the separator and the positive electrode 52. The layered positive current collector foil portion 52A is projected at the end of the electrode assembly 50 and the layered negative current collector foil portion 54A is projected at the opposite end.

As illustrated in FIG. 1, the electrode assembly 50 is placed with the axial direction thereof aligned with the horizontal direction and the thickness direction is aligned with the front-rear direction. Then, the electrode assembly 50 is connected to the current collectors 28A and 28B of the terminal unit 20. Namely, the electrode assembly 50 is arranged such that a dimension that measures in the front-rear direction is smaller than a dimension that measures in the vertical direction in a cross section perpendicular to the axial direction, that is, such that the electrode assembly 50 projects larger in the vertical direction than the front-rear direction.

The positive current collector foil portion 52A is located at the right of the electrode assembly 50 and connected to the positive current collector 28A. The negative current collector foil portion 54A is located at the left of the electrode assembly 50 and connected to the negative current collector 28B.

The clip set 60 includes positive clips 60A and negative clips 60B. The positive current collector 28A and the positive current collector foil portion 52A are sandwiched between the positive clips 60A and welded together by ultrasonic welding. The negative current collector 28B and the negative current collector foil portion 54A are sandwiched between the negative clips 60B and welded together by ultrasonic welding. Each clip 60A or 60B is made of material having about the same resistance as that of the current collectors 28A and 288 or the current collector foil portions 52A and 54A. The positive clips 60A may be made of aluminum alloy. The negative clips 60B may be made of copper alloy.

The electrode assembly 50 is accommodated in the case 62 after connected to the current collectors 28A and 28B. Therefore, the electrode assembly 50 is accommodated in the case 62 with the axial direction thereof aligned with the horizontal direction and the thickness direction is aligned with the front-rear direction.

2. Cross-sectional Shape of Cell

Figure 2:
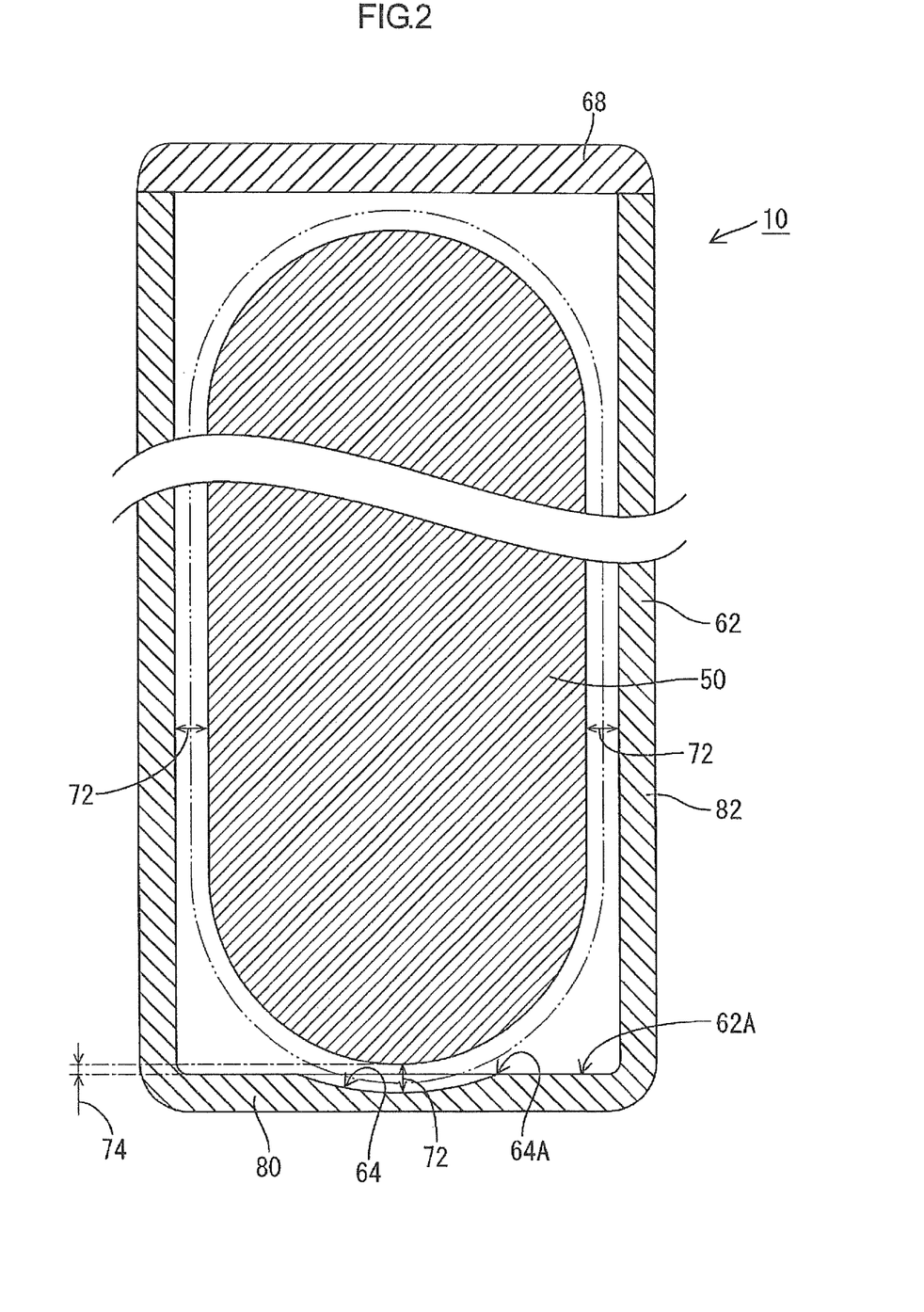
FIG. 2 is a cross-sectional view of a cell according to a first embodiment.

FIG. 2 illustrates a cross section of the cell 10 cut along line II-II perpendicular to the horizontal direction in FIG. 1. As illustrated in FIG. 2, certain clearances CL indicated by arrows 72 are provided between the electrode assembly 50 and the case 62 or the lid 68. Even if the electrode assembly 50 expands as illustrated with two-dot chain line in FIG. 2 due to heat generated during charge and discharge or ambient temperature variations, the electrode assembly 50 does not touch the case 62 or the lid 68 in the early phase since the cell 10 is put in use. In the late phase since the cell 10 is put in use, the electrode assembly 50 may expand further than in the early phase. The clearances CL are defined such that the electrode assembly 50 in the late phase barely touches the case 62 and the lid 68. With this configuration, the electrode assembly 50 is less likely to be in contact with the case 62 or the lid 68 with a pressure equal to or higher than a predetermined level and to be damaged. Therefore, a problem such as abnormal discharge and heat generation due to the damage to the electrode assembly 50 is less likely to occur.

As described above, the electrode assembly 50 is arranged such that the thickness direction is aligned with the front-rear direction. The electrode assembly 50 has round upper and lower end with arc outlines in the cross-sectional view along line II-II. The case 62 includes a bottom 80 with an inner wall 62A that is opposite the lower end of the electrode assembly 50. A recess 64 is formed in the inner wall 62A in a shape corresponding to a convex shape of the lower end of the electrode assembly 50. In this embodiment, the recess 64 is provided only in the bottom 80 of the case 62, and not in the lid 68 or walls 82.

Figure 3:
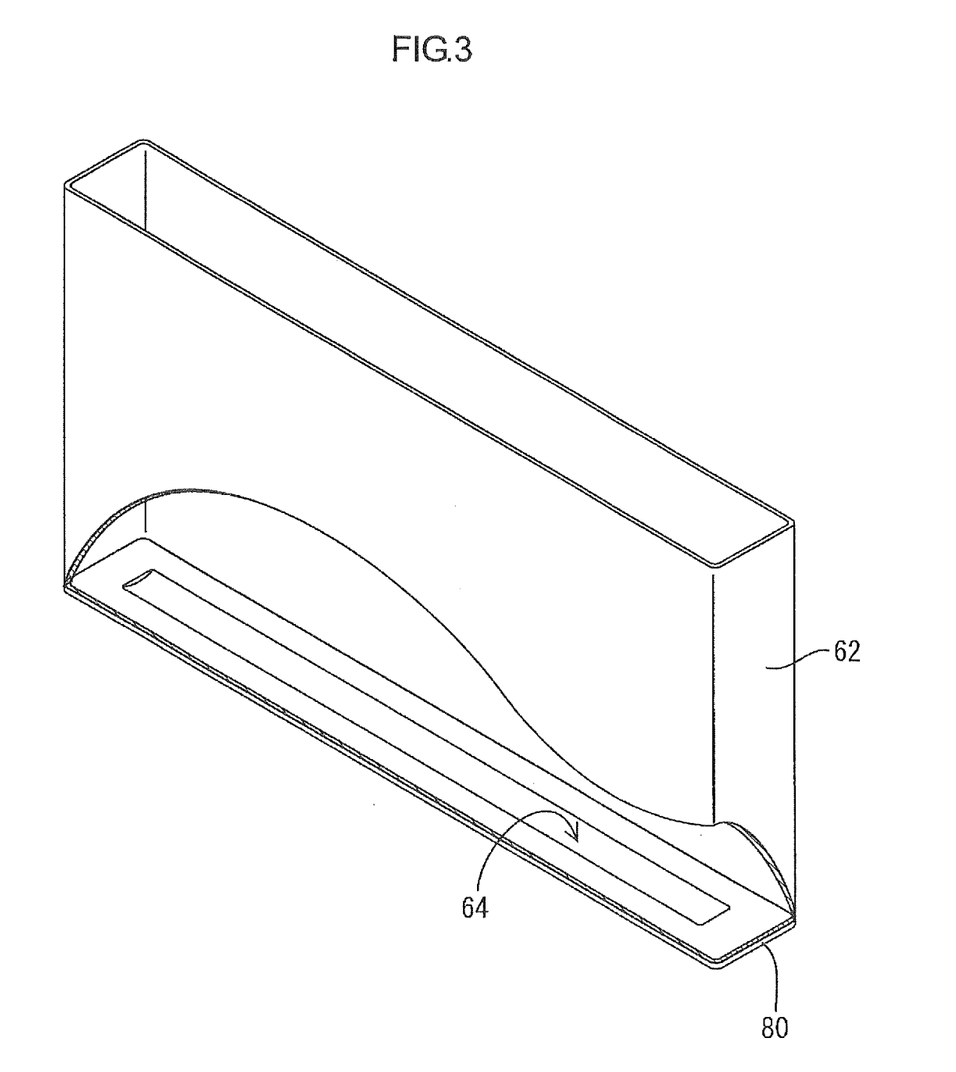
FIG. 3 is a perspective view of a case according to the first embodiment.

As illustrated in FIGS. 2 and 3, the recess 64 is formed in a portion opposite the lowest point of the electrode assembly 50, at which the electrode assembly 50 projects downward the farthest, and a portion therearound. The recess 64 takes a form of a groove that extends in the horizontal direction. As illustrated in FIG. 2, the inner surface area of the bottom 80 increases as the inner wall 62A deforms toward the outer side of the cell 10 in the recess 64. The portion of the bottom 80 including the recess 64 is thinner than other portions of the bottom 80 without the recess 64. The lower end of the electrode element 50 may be an example of a convex portion.

The recess 64 is formed the deepest in the portion opposite the lowest point of the electrode assembly 50. The depth of the recess 64 is preferably equal to or smaller than 70% of the thickness of the bottom 80 to maintain the strength of the case 62, more preferably, 20% to 50% of the thickness of the bottom 80 of the case 62. For an easy-to-understand purpose, the recess 64 is illustrated rather deep in the drawing, for example, FIG. 2. However, the depth of the recess 64 in the deepest portion is 30% of the thickness of the bottom 80 of the case 62 in this embodiment.

The recess 64 has an arc-like shape in a cross section perpendicular to the horizontal direction similar to the lower end of the electrode assembly. The center of curvature is located on the center line of the electrode assembly 50 in the front-rear direction. The curvature radius of the recess 64 is larger than that of the lower end of the electrode assembly 50. Therefore, the electrode assembly 50 and the bottom 80 of the case 62 are the closest to each other at the center of the recess 64 at which the recess 64 is the deepest but not at an edge 64A of the recess 64.

In the cell 10, the distance between the lower end of the electrode assembly 50 and the center of the recess 64 is set to the certain clearance CL. Therefore, a distance K indicated by arrows 74 in FIG. 2 between the lower end of the electrode assembly 50 and the inner wall 62A outside the recess 64 measuring in the vertical direction is smaller than the certain clearance CL.

3. Effects (1) In the cell 10 of this embodiment, the distance K indicated by the arrows 74 in FIG. 2 can be set smaller than the certain clearance CL by forming the recess 64 in the bottom 80 of the case 62. Therefore, in comparison to a related art in which the distance K needs to be set equal to the certain clearance CL, the case 62 can be arranged closer to the electrode assembly 50. Therefore, the cell 10 can be reduced in size.

(2) In the cell 10 of this embodiment, the recess 64 is formed in the bottom 80 of the case 62 and thus the surface area of the inner wall 62A of the bottom 80 is increased. Furthermore, the thickness of the bottom 80 is thinner in the portion in which the recess 64 is formed than in the portion in which the recess 64 is not formed. In comparison to a case in which the recess 64 is not formed, the case 62 can be arranged closer to the electrode assembly 50 and thus the cell 10 can be reduced in size. Because the recess 64 is formed in the inner wall 62A of the case 62, a distance between the electrode assembly 50 and the outer surface of the bottom 80 is reduced. Furthermore, the surface area of inner wall of the case 62 facing the electrode assembly 50 is increased. Therefore, efficiency in cooling of the cell 10 through the case 62 can be improved.

(3) The larger the depth of the recess 64 the smaller the size of the cell 10 and the better the efficiency in cooling of the cell 10. However, if the recess 64 is far deep, the strength of the case 62 decreases. In this embodiment, the depth of the recess 64 in the deepest portion is 30% of the thickness of the bottom 80 of the case 62. Therefore, the cell 10 can be decreased in size and improved in cooling efficiency while the strength of the case 62 is maintained at a high level.

(4) In the cell 10 of this embodiment, the curvature radius of the recess 64 is larger than that of the lower end of the electrode assembly 50. Therefore, the distance between the center of the recess 64 in which the depth of the recess 64 is the largest and the electrode assembly 50 can be set to the certain clearance CL and thus the cell 10 can be reduced in size. Even when the distance is set as above, the distance between the edge 64A of the recess 64 and the electrode assembly 50 is not set smaller than the clearance CL.

(5) In the cell 10 of this embodiment, the recess 64 is not formed in the walls 82 of the case 62 and the surfaces of the walls 82 of the case 62 are flat. With this configuration, the positive electrode 52 and the negative electrode 54 are less likely to separate from each other in the front-rear direction even when the electrode assembly 50 expands. An increase in internal resistance of the electrode assembly 50 due to the separation between the positive electrode 52 and the negative electrode 54 can be suppressed. Therefore, stable output characteristic of the cell 10 can be ensured.

Second Embodiment

Figure 4:
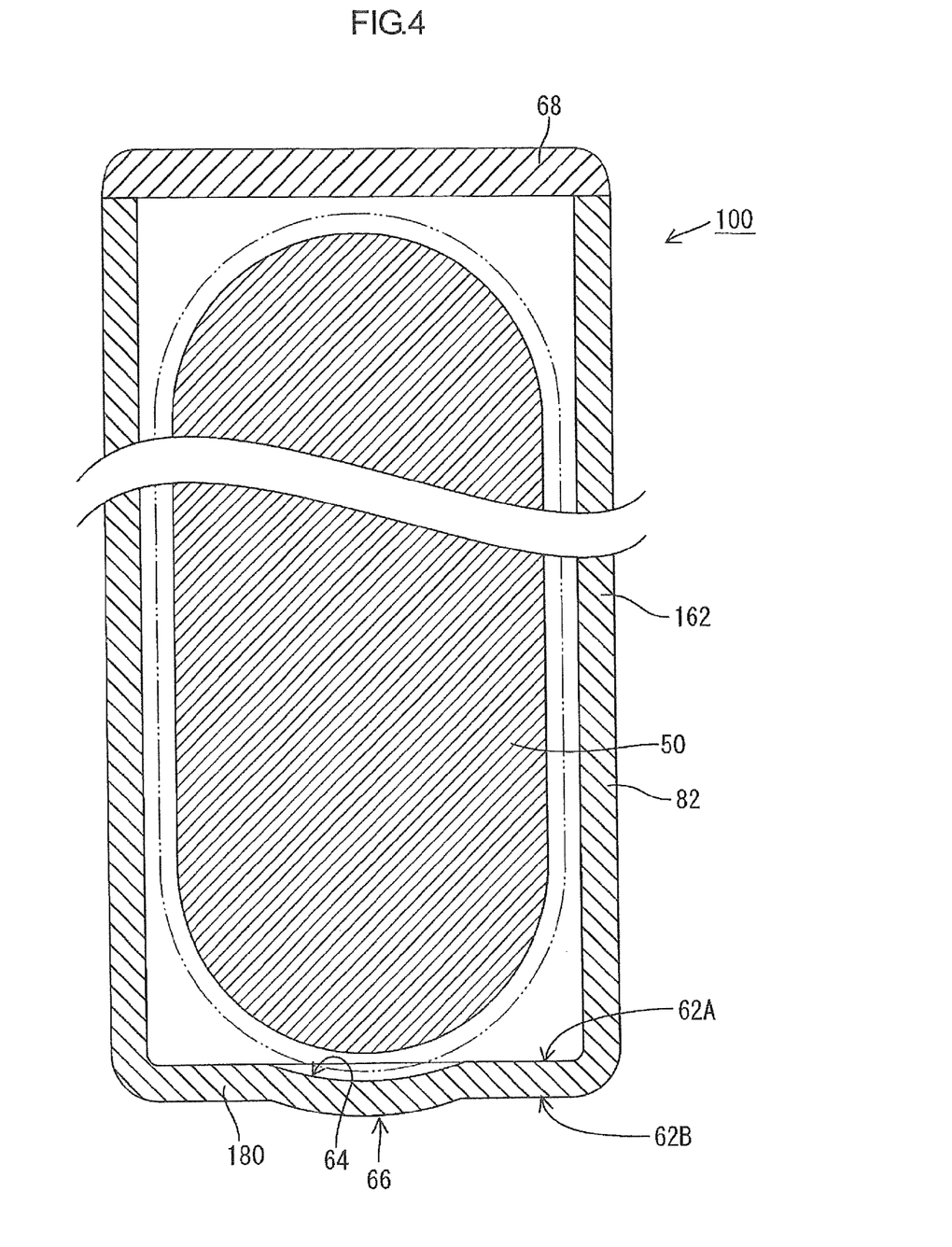
FIG. 4 is a cross-sectional view of a cell according to a second embodiment.

A second embodiment will be described with reference to FIG. 4.

1. Cross-sectional Shape of Cell

The cell 100 is different from the first embodiment in that a protrusion 66 is formed in a portion of the outer wall 62B of a bottom 180 of a case 162 corresponding to the recess 64. Therefore, the surface area of the bottom 180 is larger than that of the bottom 80 in the first embodiment while the thickness of the bottom 180 in a portion in which the recess 64 and the protrusion 66 are formed is the same as that of other portions of the bottom 180 in which the recess 64 and the protrusion 66 are not formed. The protrusion 66 may be an example of a protrusion of an outer wall. The same configurations as those of the first embodiment will not be described.

2. Effects

In the cell 100 of this embodiment, the recess 64 is formed in the bottom 180 of the case 162 and thus the surface area of the inner wall 62A of the bottom 180 is increased. Furthermore, the protrusion 66 is formed on the bottom 180 of the case 162 and thus the surface area of the outer wall 62B of the bottom 180 is increased. In comparison to a case that does not have the recess 64 and the protrusion 66, efficiency in cooling of the cell 100 through the case 162 improves.

Third Embodiment

Figure 5:
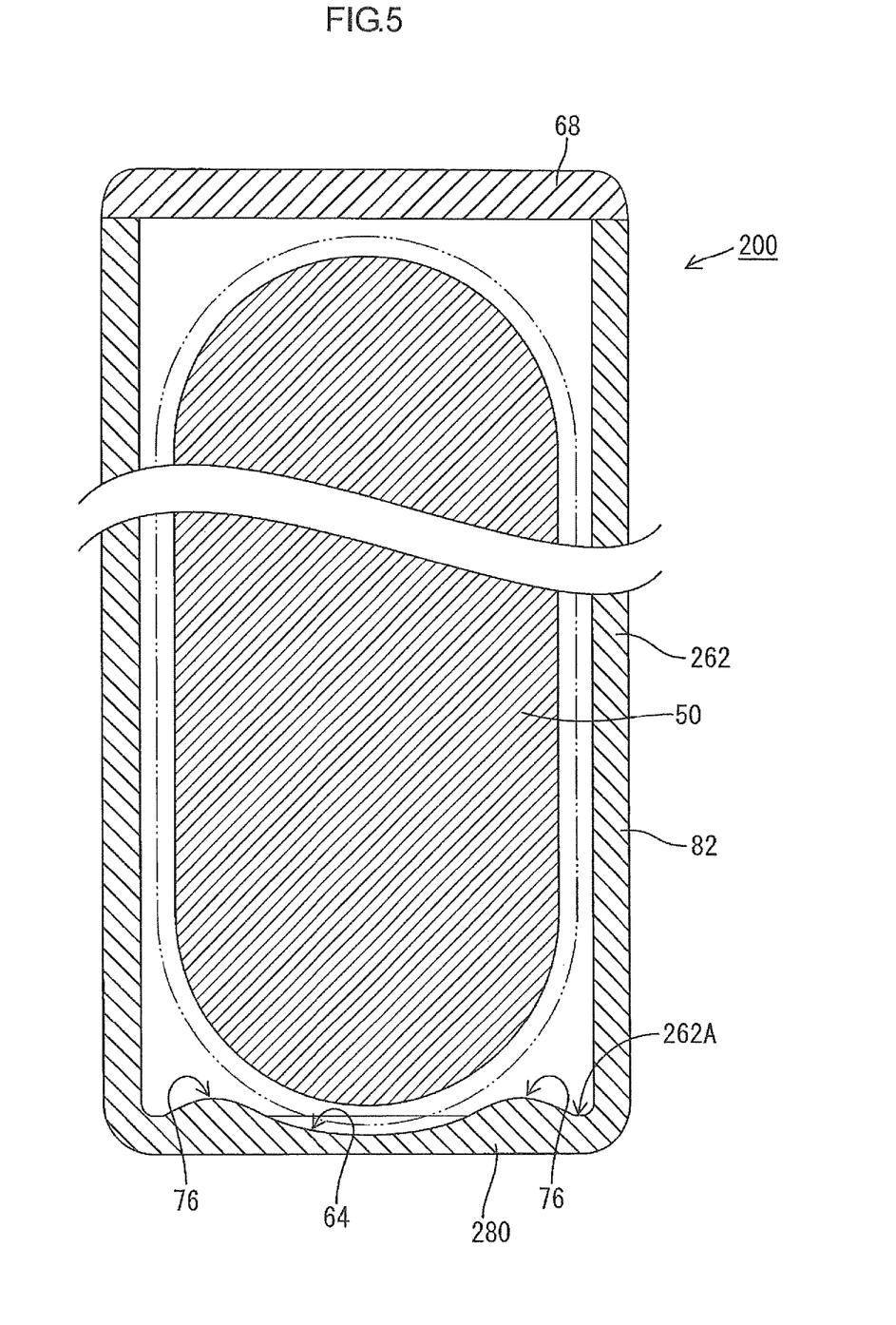
FIG. 5 is a cross-sectional view of a cell according to a third embodiment.

A third embodiment will be described with reference to FIG. 5.

1. Cross-sectional Shape of Cell

The cell 200 is different from the first embodiment in that protrusions 76 are formed on an inner wall 262A in peripheral portions of the portion of a bottom 280 of the case 262 in which the recess 64 is formed. The protrusions 76 are formed when the recess 64 is formed in the bottom 280 by pressing. The bottom 280 is formed in a flat plate-like shape in advance to the pressing. The recess 64 and the protrusions 76 are formed in and on inner wall 262A of the bottom 280 of the case 62 of this embodiment and thus the surface area is increased.

The protrusions 76 are formed in the peripheral portions of the portion that is opposite the lowest point of the electrode assembly 50 at which the electrode assembly 50 projects downward the farthest. Therefore, the clearance CL between the case 262 and the electrode assembly 50 is maintained even the protrusions 76 are provided. The same configurations as those of the first embodiment will not be described.

2. Effects

In the cell 200 of this embodiment, the recess 64 is formed in the bottom 280 of the case 262 and thus the surface area of the inner wall 262A of the bottom 280 is increased. Furthermore, the protrusions 76 are formed on the inner wall 262A of the bottom 280 of the case 262 in the peripheral portion of the portion in which the recess 64 is formed. In comparison to a case that does not have the recess 64 and the protrusions 76, efficiency in cooling of the cell 200 through the case 262 improves.

Other Embodiments

The present invention is not limited to the embodiments described above and illustrated in the drawings. The following embodiments are also included in the technical scope of the present invention.

(1) The cells 10, 100, and 200, which are secondary batteries, are described as examples of the electric storage device. However, the electric storage device may be a capacitor in which electrochemical reactions occur. The application of the electric storage device and the structure of the electrode unit are not limited to the above embodiments.

Figure 6:
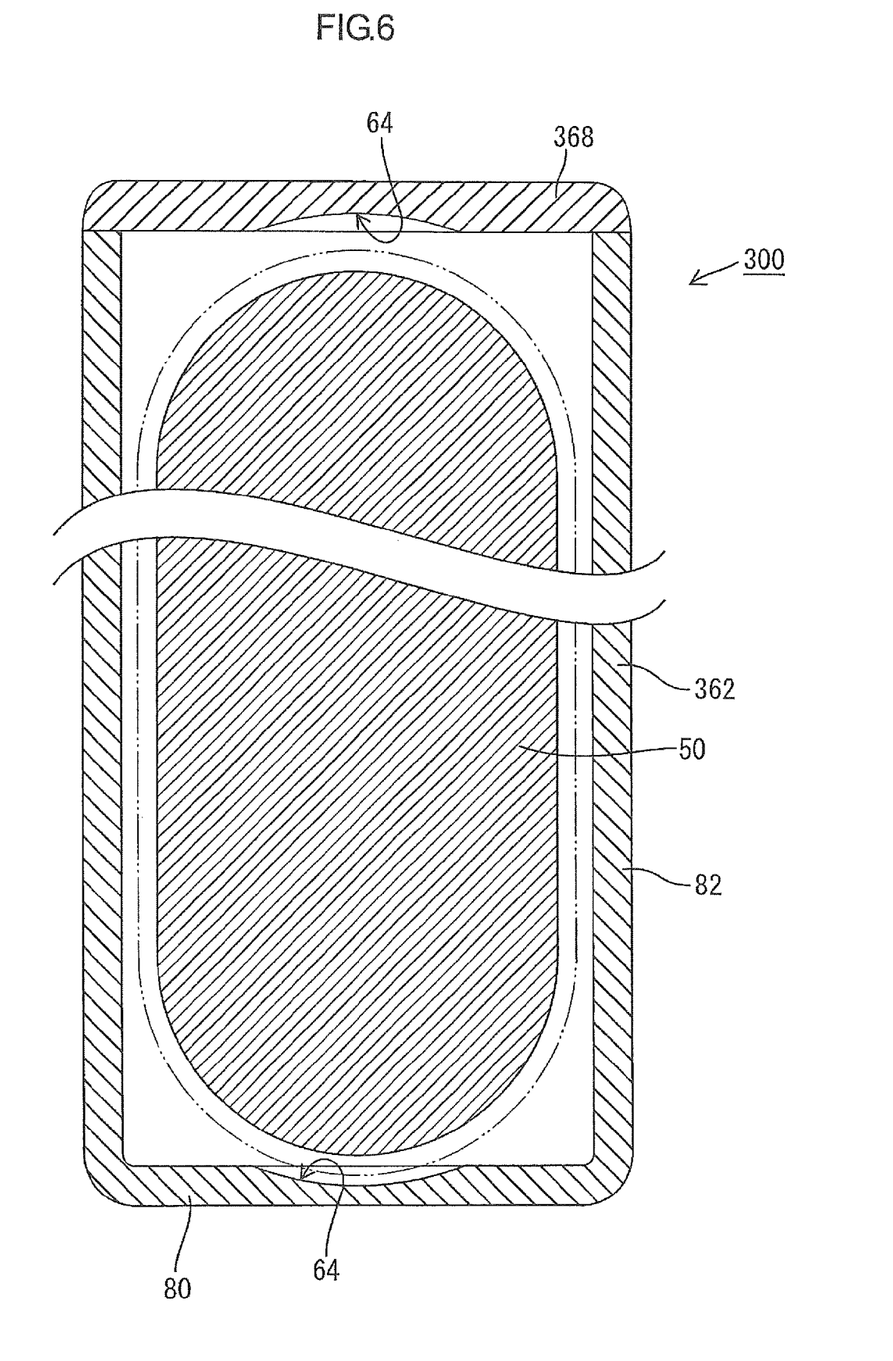
FIG. 6 is a cross-sectional view of a cell according to one of other embodiments.
Figure 7:
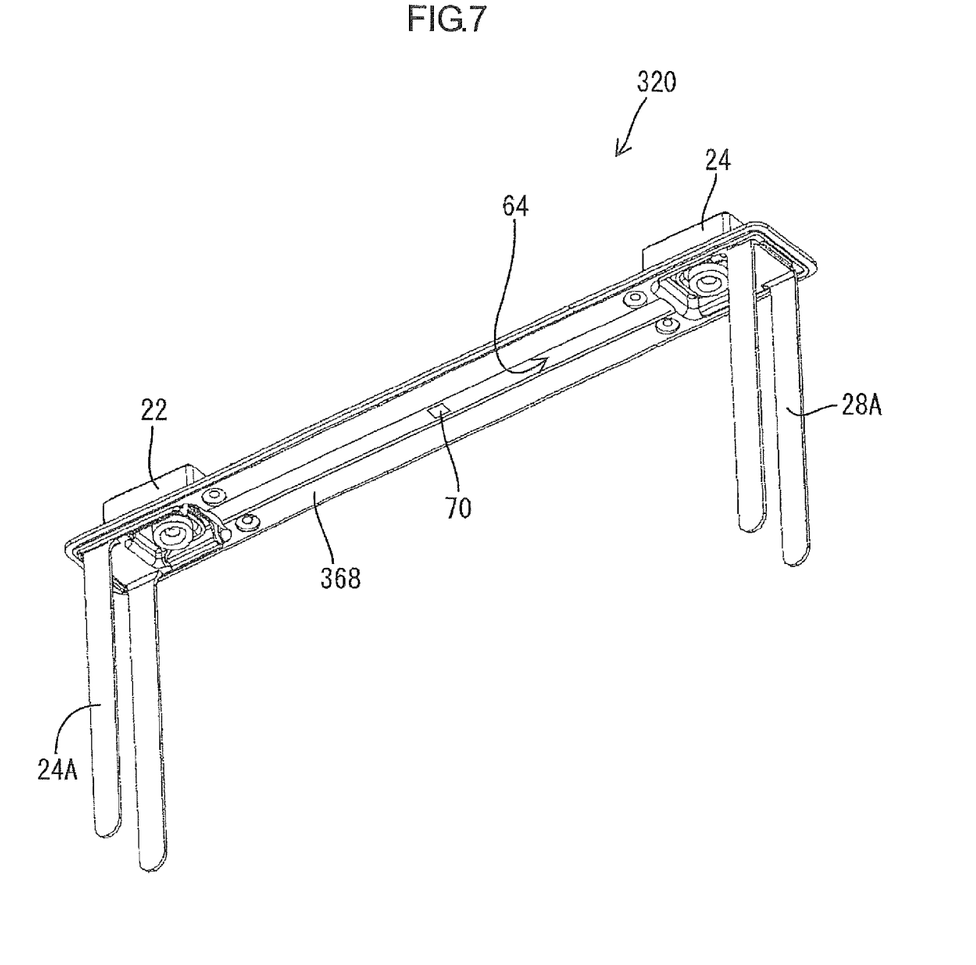
FIG. 7 is a perspective view of a lid assembly according to one of the other embodiments.

(2) In the above embodiments, the recesses 64 are formed in the bottoms 80, 180, and 280, respectively. However, the recess 64 may be formed in the lid 68 as in a lid 368 illustrated in FIGS. 6 and 7. In this configuration, the recess 64 is formed in each of the bottom 80 and the lid 368 of a case 362 facing the upper end and the lower end of the electrode assembly 50 but not in the walls 82 of the case 362. As illustrated in FIG. 6, the recess 64 is formed in the lid 368 in the portion opposite the highest point of the electrode assembly 50 at which the electrode assembly 50 projects upward the farthest and the peripheral portion thereof with respect to the front-rear direction. As illustrated in FIG. 7, the recess 64 extends in the horizontal direction. The upper end of the electrode assembly 50 may be another example of a convex portion of an electrode assembly.

Figure 8:
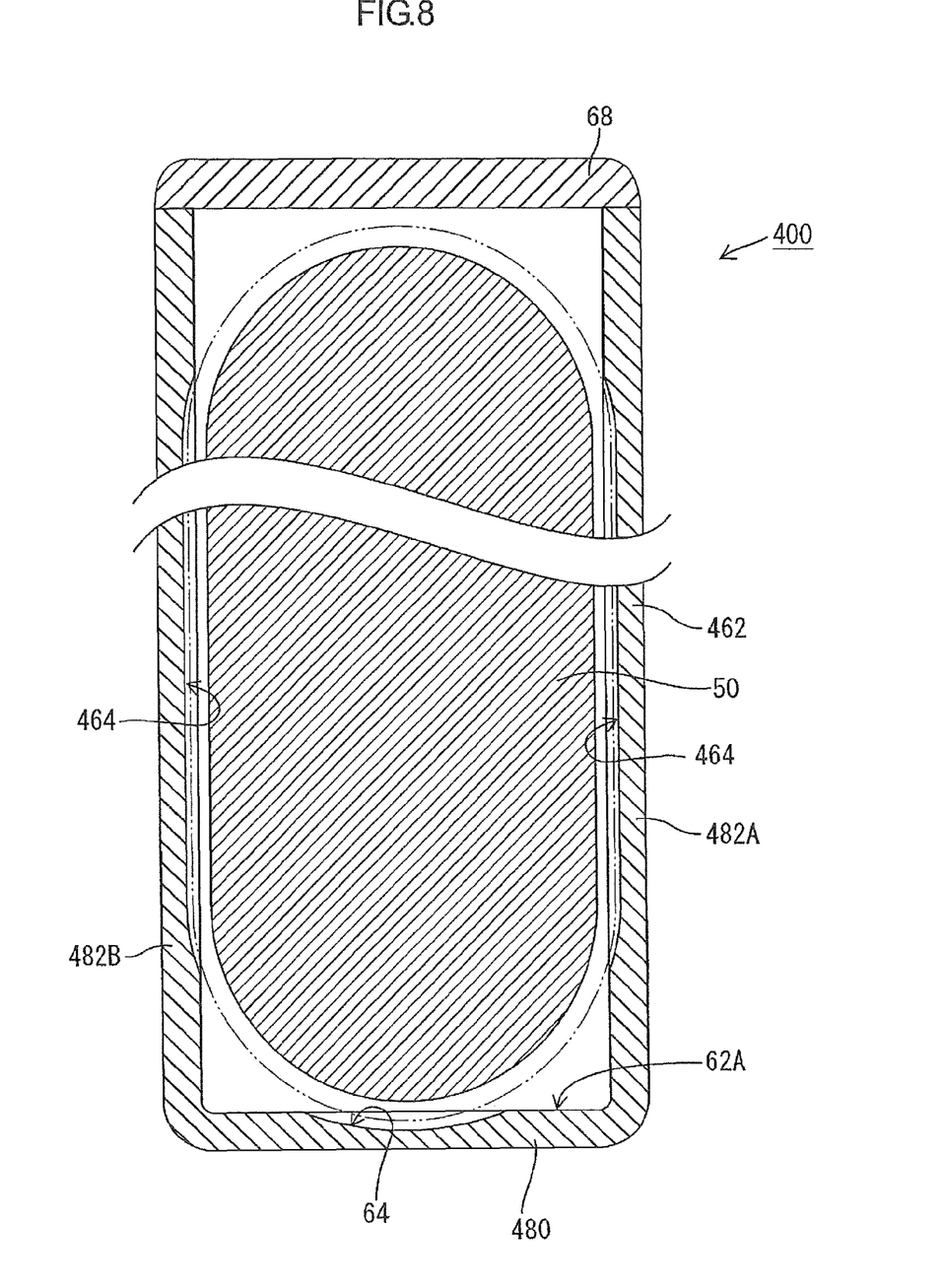
FIG. 8 is a cross-sectional view of a cell according to one of the other embodiments.
Figure 9:
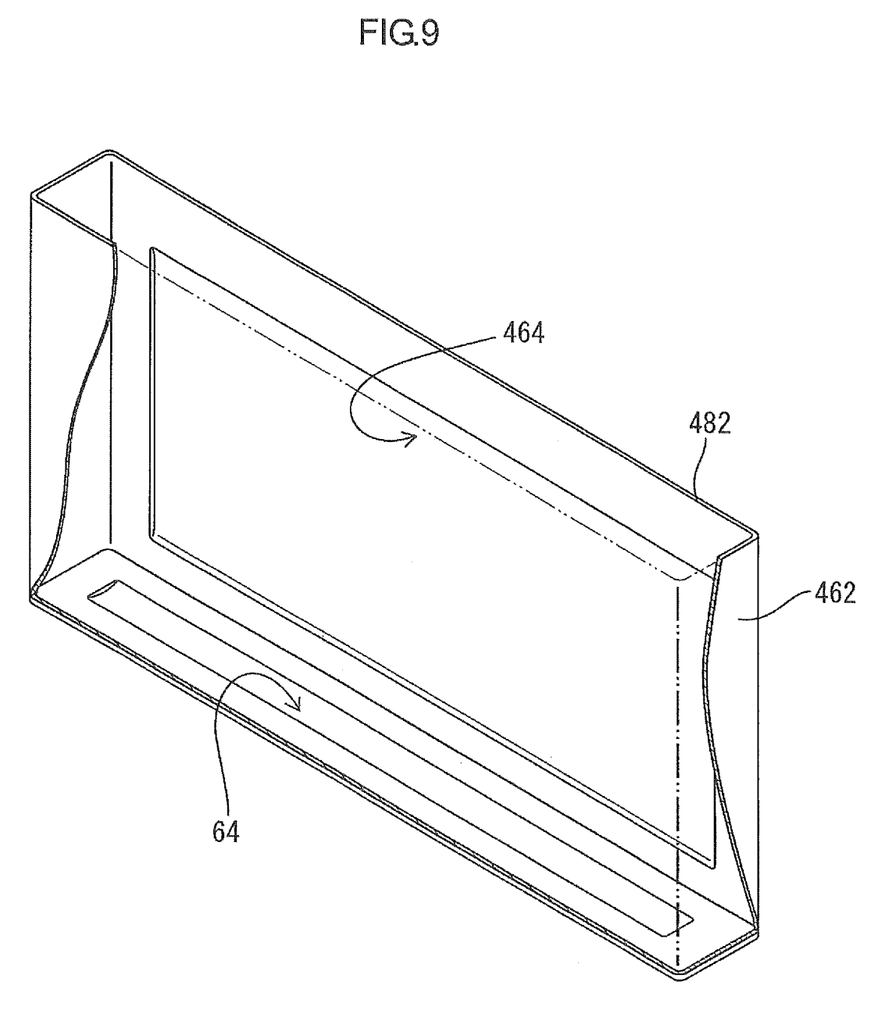
FIG. 9 is a perspective view of a case according to one of the other embodiments.

Recesses may be formed in walls 82 as in walls 482A and 482B illustrated in FIGS. 8 and 9. As illustrated in FIG. 8, recesses 464 are formed corresponding to portions of front and rear surfaces of the electrode assembly 50 at which the surfaces project the farthest in the front-rear direction and the peripheral portions thereof. As illustrated in FIG. 9, each recess 464 has a rectangular plan-view shape. Each recess 464 is formed in about a half of the corresponding wall 482A or 482B. The portion of the front surface or the rear surface of the electrode assembly 50 may be another example of a convex portion of an electrode assembly.

Figure 10:
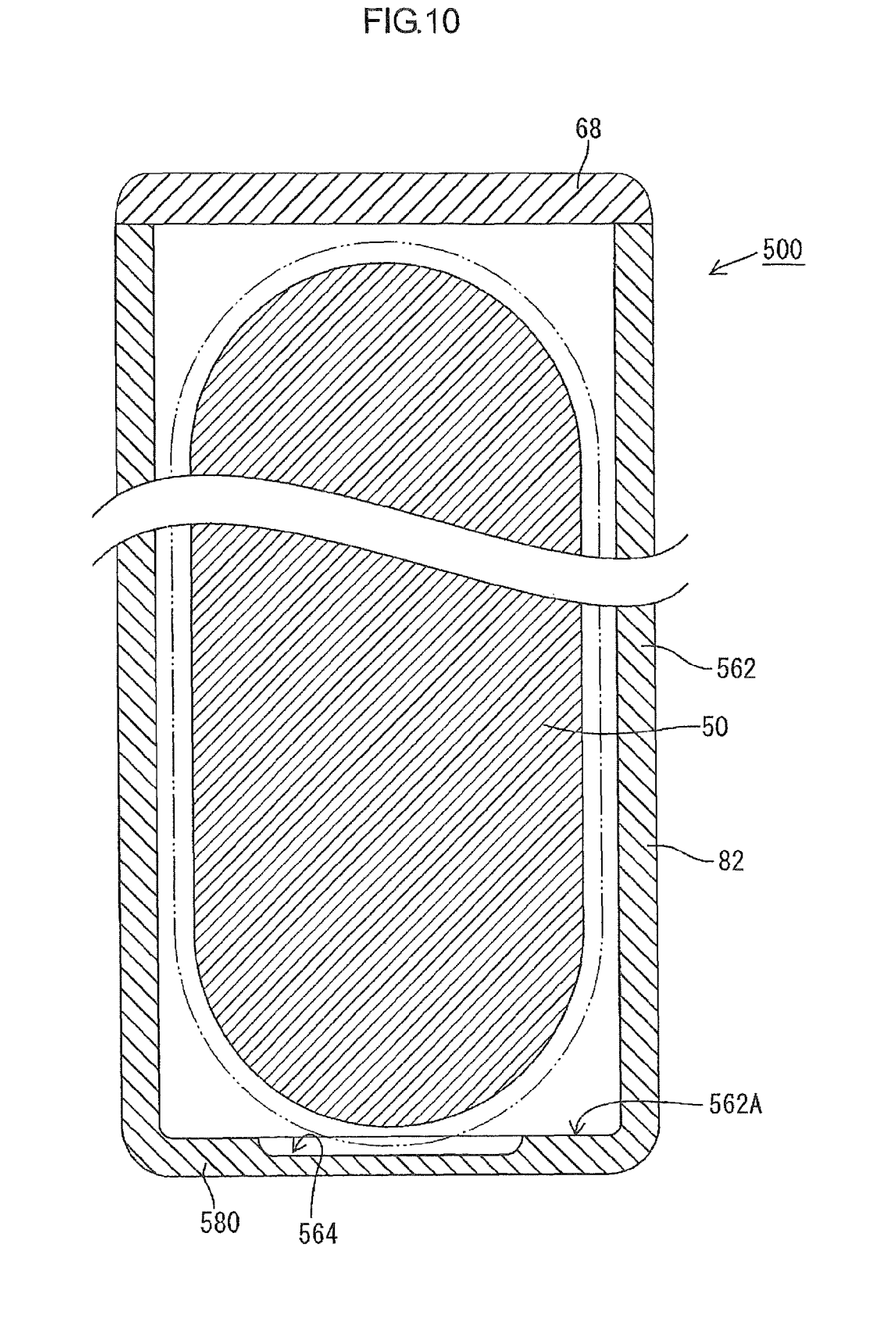
FIG. 10 is a cross-sectional view of a cell according to one of the other embodiments.

(3) Each of the recesses 64 in the above embodiments has an arc-like shape. However, the recess 64 may be a rectangular recess. Alternatively, a recess 564 illustrated in FIG. 10 may be formed. The recess 564 is formed in a rectangular plan-view shape in a bottom 580 of a case 562 in a portion opposite the lowest point of the electrode assembly 50 and with curved walls. In this configuration, the recess 564 is formed in about a half of an inner wall 562A of a bottom 580.

(4) The cases 62, 162, 262, 362, 462, and 562 in the above embodiments are made of metal such as aluminum. However, the case 62, 162, 262, 362, 462, or 562 may be made of metal other than aluminum. The cases 62, 162, 262, 362, 462, and 562 are prepared by pressing. However, a method of preparing the case 62, 162, 262, 362, 462, or 562 is not limited to pressing. Welding or other method may be used.

(5) In the above embodiments, the curvature radius of each recess 64 is larger than that of the lower end of the electrode assembly 50. However, the curvature radius of the recess 64 may be equal to the curvature radius of the lower end of the electrode assembly 50. If the curvature radiuses are equal, an entire area of the lower end of the electrode assembly 50 is in contact with the wall of the recess 64 when the electrode assembly 50 expands in the late phase of the life of the cell 10, 100, 200, 300, or 400. Therefore, the efficiency in cooling the cell 10, 100, 200, 300, or 400 improves in the late phase of the life thereof.

(6) Providing the case 62, 162, 262, 362, 462, or 562 with recess 64 or 464 in inner wall of the case 62, 162, 262, 362, 462, or 562 or the lid 368 may be effective in the following case.

The case 62, 162, 262, 362, 462, or 562 may be produced by deep drawing in a form of an open-top case to improve airtightness. If the deep drawing is used, the bottom 80, 180, 280, 380, 480, or 580 may be formed in thickness larger than a designed thickness. If such a problem occurs, the specific clearance CL cannot be provided between the lower end portion of the electrode assembly 50 and the bottom 80, 180, 280, 380, 480, or 580. Therefore, the case 62, 162, 262, 362, 462, or 562 cannot be used for the cell 10, 100, 200, 300, or 400, and yields decrease.

In such a case, for example, the recess 64 is formed in the bottom 80 of the case 62 and a distance between the lower end of the electrode assembly 50 and the center of the recess 64 indicated by the arrows 72 in FIG. 2 is set to a distance that is a sum of the specific clearance CL and a predetermined distance CL1. With this configuration, even if the thickness of the bottom 80 of the case 62 is larger than the designed thickness, the specific clearance is still provided between the lower end of the electrode assembly 50 and the bottom 80 as long as a difference between the designed thickness and the actual thickness is within the predetermined distance CL1. Therefore, the decrease in yields can be suppressed. Even when this configuration is adapted, the distance K indicated by the arrows 74 in FIG. 2 is still smaller than the clearance CL.

What is claimed is:

1. An electric storage device, comprising:
   an electrode assembly including at least one convex portion; and
   a metal case accommodating the electrode assembly and including an inner wall with a recess in a portion of the metal case opposite the at least one convex portion of the electrode assembly, and
   wherein, in a side view of the electric storage device, a point of the convex portion that protrudes farthest from the convex portion is aligned with a point of the recess that indents farthest in the metal case in a same direction that the convex portion protrudes toward the recess.

2. The electric storage device according to claim 1, wherein the portion including the recess includes a portion of the inner wall adjacent to the convex portion of the electrode assembly.

3. The electric storage device according to claim 1, wherein the recess has a shape corresponding to a shape of the convex portion of the electrode assembly.

4. The electric storage device according to claim 1, wherein the electrode assembly has a flattened roll-like shape with a cross section having a first dimension smaller than a second dimension, the first dimension measuring in a first direction, the second dimension measuring in a second direction that is perpendicular to the first direction, and
   wherein the inner wall including the recess is opposite the electrode assembly in the second direction.

5. The electric storage device according to claim 4, wherein the recess is provided only in the inner wall opposite the electrode assembly in the second direction.

6. The electric storage device according to claim 4, wherein an end of the electrode assembly in the second direction and the recess have arc-like shapes in a cross section perpendicular to an axial direction of the electrode assembly with centers of curvatures thereof being at a same point in the first direction and a curvature radius of the recess being equal to or larger than that of the end of the electrode assembly.

7. The electric storage device according to claim 4, wherein the electrode assembly is accommodated in the metal case with an axial direction thereof aligned with a horizontal direction and the second direction aligned with a vertical direction, and
   wherein the recess is formed in an inner wall of at least one of a top and a bottom of the metal case.

8. The electric storage device according to claim 1, wherein the portion of the metal case in which the recess is formed is thinner than a peripheral portion of the metal case.

9. The electric storage device according to claim 1, wherein the metal case further includes an outer wall with a protrusion in a portion corresponding to the recess.

10. The electric storage device according to claim 1, wherein the metal case further includes a protrusion on the inner wall around a portion of the inner wall in which the recess is formed.

11. The electric storage device according to claim 1, wherein the point of the convex portion and the point of the recess are aligned within a centerline of the electrode assembly.

12. The electric storage device according to claim 11, wherein the metal case further includes an outer wall including a protrusion, a point of the protrusion that protrudes farthest from the outer wall being aligned with the point of the recess that indents farthest in the metal case in a same direction that the protrusion protrudes from the outer wall within the centerline of the electrode assembly.

13. The electric storage device according to claim 1, wherein an entirety of the electrode assembly is spaced apart from the metal case.

14. The electric storage device according to claim 1, wherein the recess consists of a single recess that includes a single indentation located opposite to the point of the convex portion that protrudes farthest from the convex portion.

15. An electric storage device, comprising:
    an electrode assembly including a convex portion; and
    a case accommodating the electrode assembly and including an inner wall with a recess that indents in the case opposite the convex portion of the electrode assembly,
    wherein, in a side view of the electric storage device, a point of the convex portion that protrudes farthest from the convex portion is aligned with a farthest point of the recess that indents in the case in a same direction that the convex portion protrudes toward the recess.

16. The electric storage device according to claim 15, wherein the point of the convex portion and the farthest point of the recess are aligned within a centerline of the electrode assembly, and
    wherein the case comprises a metal case.

17. The electric storage device according to claim 16, wherein the case further includes an outer wall including a protrusion, a point of the protrusion that protrudes farthest from the outer wall being aligned with the farthest point of the recess that indents in the case in a same direction that the protrusion protrudes from the outer wall within the centerline of the electrode assembly.

18. The electric storage device according to claim 15, wherein an entirety of the electrode assembly is spaced apart from the case.

19. The electric storage device according to claim 15, wherein the recess consists of a single recess that includes a single indentation located opposite to the point of the convex portion that protrudes farthest from the convex portion.

* * * * *